Dec. 8, 1959 J. B. M. VAN BERKUM 2,916,323
TONG COMPRISING A REMOTELY CONTROLLED GRIPPING DEVICE
DETACHABLY SECURED TO A BAR, AND A HOLDER
ADAPTED TO THE GRIPPING DEVICE
Filed March 29, 1954
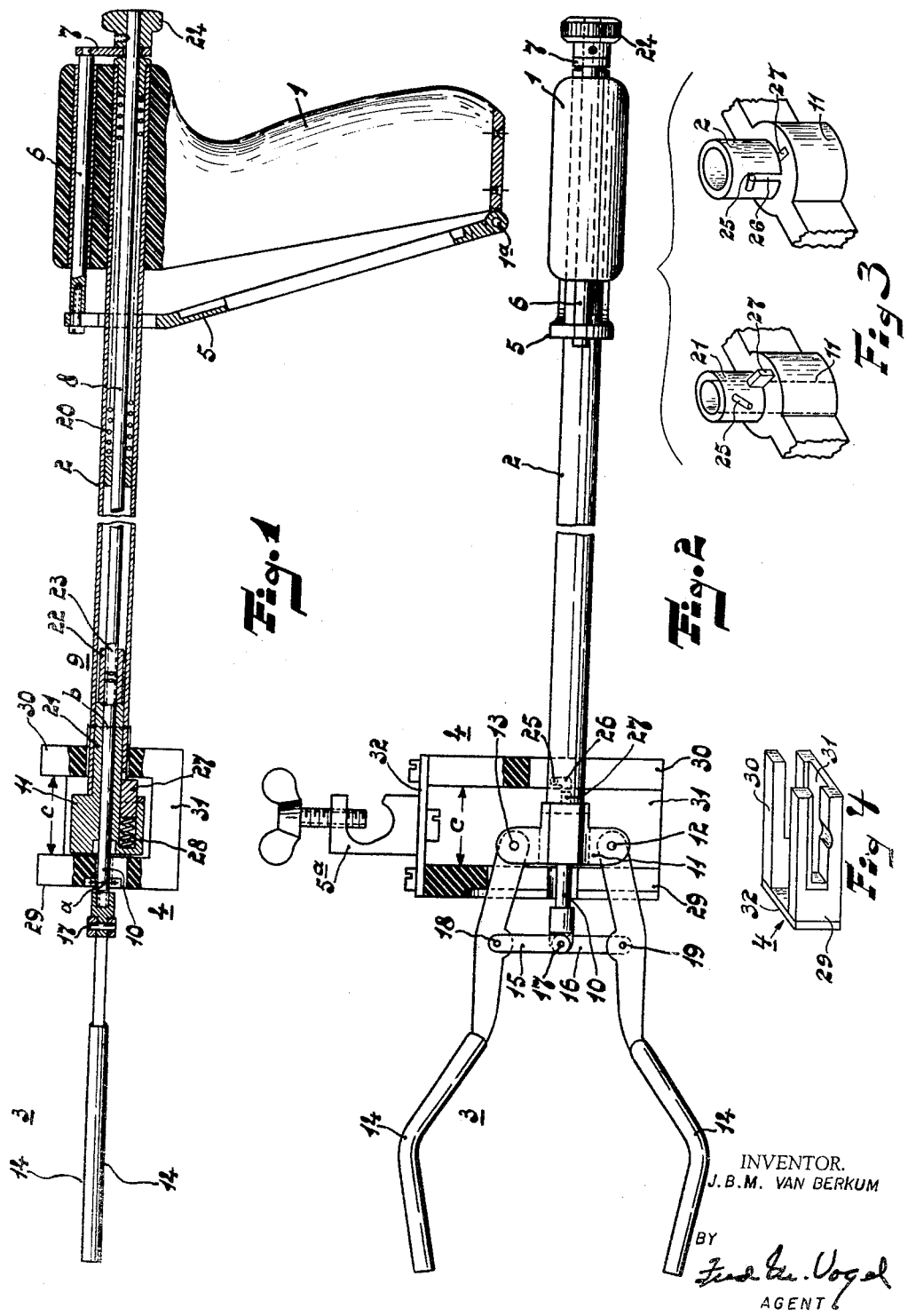
INVENTOR.
J.B.M. VAN BERKUM
BY
AGENT

United States Patent Office 2,916,323
Patented Dec. 8, 1959

2,916,323

TONG COMPRISING A REMOTELY CONTROLLED GRIPPING DEVICE DETACHABLY SECURED TO A BAR, AND A HOLDER ADAPTED TO THE GRIPPING DEVICE

Joannes Bernardus Maria Van Berkum, Amsterdam, Netherlands, assignor, by mesne assignments, to North American Philips Company, Inc., New York, N.Y., a corporation of Delaware Application March 29, 1954, Serial No. 419,263

Claims priority, application Netherlands April 22, 1953

2 Claims. (Cl. 294—115)

For the remote handling of articles it is known to employ tongs comprising a remotely controlled gripping device. In practice, it may happen that the gripping device, which is usually secured to a bar, does not accommodate particular articles due to their size. In order to mitigate this limitation it is known to construct the tongs in such a manner that the gripping device is detachably coupled to the bar so that one and the same bar can be employed by replacing one gripping device by another. This is effected by declutching by hand the coupling means usually provided in the immediate proximity of the gripping device, replacing the initially used gripping device by another one and re-engaging the clutch.

Particularly when the bar has a considerable length or the gripping device is intended for use in chambers containing radio-active substances, replacement by hand of one gripping device by another one is cumbersome and should be avoided. In this instance, said constructions are out of place.

The present invention provides a solution of this problem. It consists in the combination, first, of tongs comprising a remotely controlled gripping device which is detachably fitted to a bar and, second, a stationary holder adapted to the gripping device, in which combination a locking device prevents disengagement of the fixtures between the gripping device and the bar during operation of the gripping device and is brought into its inoperative position by means of a device forming part of the holder, when fitting the gripping device into the holder, and, with the holder acting as a reacting member, the fixtures between the gripping device and the bar can be remotely loosened and the bar can be separated from the gripping device which remains in the holder.

In a suitable embodiment, the combination according to the invention has the feature that the fixtures between the bar and the gripping device consist of a bayonet joint, the locking device being a spring-loaded stud which closes the bayonet slot in its operative position.

In order that the invention may be readily carried into effect, it will now be described in greater detail with reference to the accompanying drawing, in which one form thereof is shown by way of example and in which:

Fig. 1 shows the tongs part in lateral view, part in section. These tongs comprise a gripping device secured to a bar. This figure also shows the holder associated with the gripping device;

Fig. 2 is a plan view of said parts;

Fig. 3 is a partial fragmentary view of the bridge-piece, bar and associated structure; and Fig. 4 is a perspective view of the support holder embodying my present invention.

The tongs mainly comprise a handle 1 with associated control means and a bar 2 connecting the handle to a gripping device 3. These tongs are associated with a holder 4 comprising a bracket 5a by means of which the holder 4 is secured to a support (not shown). If the tongs are employed for handling articles in a chamber in which radio-activity prevails said support with the holder 4 are contained in said chamber and to be considered stationary.

In the manner usually employed for such tongs the gripping device 3 is controllable from the handle 1. To this end the handle 1 comprises a trigger 5 which is pivoted to the handle at 1a and is secured at its other end to a bar 6 movably supported in the handle 1. The right-hand end of the bar 6 is connected through a bridge-piece 7 to the drawbar portion 8 supported inside the bar 2. Said drawbar portion 8 is connected through a clutch 9 set out hereinafter to the drawbar portion 10 inside the portion 3 of the gripping device. This portion 3 comprises a bridge-piece 11 with fulcrums 12 and 13 which act as pivots for the gripping arms 14. The drawbar portion 10 is connected to the gripping arms 14 by means of bars 15 and 16 which are movable at one end at the pivot 17 at the left-hand end of the drawbar portion 10 and at the other end at fulcrums 18 and 19 of the gripping arms 14. The handle 1 contains a compression spring 20 which, on releasing the trigger 5 pulled against the handle 1, urges the trigger to the left with the result that the jaws 14 of the gripping device 3 open automatically through the intermediary of the drawbar portions 8 and 10. So far, the tongs described, apart from the presence of the clutch 9 are not fundamentally different from the existing tongs.

The aforesaid bridge-piece 11 comprises at its right-hand end an integral tubular potrion 21 fitting the hollow bar 2 which is secured to the handle 1. Said part 21 is slidable on portion 10 of the drawbar, which portion carries at its right-hand end an internally threaded sleeve 22 accommodating the threaded left-hand end 23 of the drawbar portion 8. Secured to the extreme right-hand end of the drawbar portion 8 is a knurled knob 24 which permits the drawbar portion 8 to be rotated relatively to the bar 2. The knob 24 permits the threaded portion 23 of the drawbar portion 8 to be screwed into and out of the threaded sleeve 22 forming part of the drawbar portion 10. The tubular part 21 of the bridge piece 11 further carries a bayonet pin 25 (Fig. 2) and the left-hand end of the hollow bar 2, which is consequently slidable over the extension 21 of the bridge piece 11, is provided with a bayonet slot 26 also shown in Fig. 2. By means of this bayonet joint the interchangeable part of the tongs can be secured to the bar.

In order to make sure when using the tongs, that the interchangeable part cannot unexpectedly come off the bar, this construction comprises a locking member for the bayonet joint, which member is a slidable pawl 27 forming part of the bridge piece 11. Under the action of a compression spring 28 incorporated in the bridge piece 11, said pawl is invariably urged outwards. The pawl has such a width as to fit the bayonet joint with a little clearance space. When the pawl is in the bayonet slot, displacement of the bridge piece 11 relative to the bar 2 is impossible so that loosening of said bayonet joint is not to be feared as long as the pawl is in the bayonet slot.

According to the invention the tongs are used in combination with the holder mounted in a stationary manner in the chamber in which radio-activity prevails. This holder comprises two forks 29, 30 interconnected by a bottom part 31 and a rear part 32. The spacing $a$ of the teeth of the fork 29 is chosen to be such as to exactly accommodate the right-hand ends of the gripping arms 14 and of the drawbar portion 10, the spacing $b$ of the teeth of the fork 30 being matched to the outside diameter of the bar 2. The spacing $c$ of the forks 29 and 30 is so chosen as to accommodate with a little play the bridge piece 11 and the pawl 27 in its outward position.

If the gripping device 3 is to be removed from the part 2, the tongs with released trigger 5 is placed into the holder in the aforesaid manner. Subsequently the knob 24 is loosened to the effect of disengaging the clutch 9 between the drawbar portions 8 and 10. The drawbar portion 10 is prevented from following this movement since it is integral with the jaws 14 which cannot follow this movement due to the shape of the fork 29. After the clutch 9 has been disengaged, the handle 1 is slightly moved to the right, the pawl 27 being repelled by the fork 30 and against the force of spring 28 in the bridge piece 11, thus clearing the bayonet slot 26. With the pawl 27 completely repelled into the bridge piece 11, rotation of the handle 1 about the axis of bar 2 permits the bayonet pin 25 first to be turned so far into the bayonet slot 26 as to be situated in front of its opening, a movement in the direction of the centre line of bar 2 subsequently permitting said bar to be removed from the bayonet pin 25. The handle 1 with the bar 2 then stands clear from the gripping portion 3 which remains in the holder 4.

If the handle 1 with the bar 2 is again to be furnished with a gripping device (the same or another one) the bar 2 is approached to the holder associated with such a gripping device. The bayonet slot 26 is moved over the cylindrical portion 21 and over the bayonet pin 25, the end surface of the left-hand end of the bar 2 then contacting with the pawl 27 in its outward position. During the further movement the pawl 27 is urged into the bridge piece, the bayonet pin can be introduced into the transverse portion of the bayonet slot and during rotation of the bar 2 relative to the bridge piece 11 the pawl 27 snaps at a given instant into the axial part of the bayonet slot. When the knurled knob 24 is subsequently turned in a clockwise direction, the drawbar portion 8 is secured through the clutch 9 to the drawbar portion 10. The gripping device can then be removed from the holder 4 by means of the handle and the tongs are again ready for use.

All of the said manipulations can thus be remotely effected so that there is no need for touching by hand portions of the tongs which have stayed in the chamber wherein radio-active radiation prevails.

What is claimed is:

1. A gripping device comprising a hollow, elongated bar, a handle secured to one end of said bar, an operating rod in said bar and projecting from both ends thereof, means attached to said handle and secured to said operating rod at one end thereof to move said operating rod axially within said bar, said operating rod being constituted of two sections, one section projecting beyond the bar adjacent to the handle, the second section projecting beyond the other end of said bar, clutch means connecting said sections of said rod, means for engaging and disengaging said clutch means, a removable bridge piece, tongs comprising a pair of gripping arms, each arm being pivotally secured to said bridge piece on opposite sides thereof, means connecting each gripping arm to said operating rod for opening and closing said arms, means connecting said bridge piece to said bar, said means comprising a bayonet slot in said bar, a bayonet pin in said bridge piece adapted to be inserted in said bayonet slot, and locking means for locking said bridge piece to said bar after said bayonet pin is located in said bayonet slot comprising a pawl, and spring means urging said pawl into said bayonet slot thereby locking said bridge piece and said bar.

2. A gripping device comprising a hollow, elongated bar, a stationary support holder supporting said bar, a handle secured to one end of said bar, an operating rod in said bar and projecting from both ends thereof, means attached to said handle and secured to said operating rod at one end thereof to move said operating rod axially within said bar, said operating rod being constituted of two sections, one section projecting beyond the bar adjacent to the handle, the second section projecting beyond the other end of said bar, clutch means connecting said sections of said rod, means for engaging and disengaging said clutch means, a removable bridge piece, tongs comprising a pair of gripping arms, each arm being pivotally secured to said bridge piece on opposite sides thereof, means connecting each gripping arm to said operating rod for opening and closing said arms, means connecting said bridge piece to said bar, said means comprising a bayonet slot in said bar, a bayonet pin in said bridge piece adapted to be inserted in said bayonet slot, and locking means for locking said bridge piece to said bar after said bayonet pin is located in said bayonet slot comprising a pawl, and spring means urging said pawl into said bayonet slot thereby locking said bridge piece and said bar, and a part of said support holder engageable with said pawl and urging the latter out of said bayonet slot when unlocking said bridge piece from said bar.

References Cited in the file of this patent

UNITED STATES PATENTS

| | | |
|---|---|---|
| 576,756 | Cole | Feb. 9, 1897 |
| 1,486,158 | Price | Mar. 11, 1924 |
| 1,547,285 | Armstrong | July 28, 1925 |
| 2,387,633 | Alpert | Oct. 23, 1945 |
| 2,437,779 | Carpenter | Mar. 16, 1948 |
| 2,491,711 | Calhoun | Dec. 20, 1949 |
| 2,583,903 | Taylor | Jan. 29, 1952 |
| 2,660,457 | Mallon | Nov. 24, 1953 |
| 2,673,751 | Finch | Mar. 30, 1954 |